United States Patent
Horng et al.

(10) Patent No.: US 6,815,916 B2
(45) Date of Patent: Nov. 9, 2004

(54) SPEED-CONTROL DRIVE CIRCUIT FOR A D.C. BRUSHLESS FAN MOTOR

(75) Inventors: Alex Horng, Kaohsiung (TW); Ying-Ya Lu, Kaohsiung Hsien (TW); Ming-Shen Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/123,280

(22) Filed: Apr. 17, 2002

(65) Prior Publication Data

US 2003/0198464 A1 Oct. 23, 2003

(51) Int. Cl.⁷ .............................. H02P 5/00; H02P 1/50
(52) U.S. Cl. ..................... 318/138; 318/439; 318/723; 318/503
(58) Field of Search ................................. 318/138, 254, 318/439, 810, 720–724, 800, 811, 807, 503; 388/831; 327/365, 376, 377

(56) References Cited

U.S. PATENT DOCUMENTS

| | | | |
|---|---|---|---|
| 4,544,868 A | * 10/1985 | Murty | 318/254 |
| 4,656,533 A | * 4/1987 | Sakai et al. | 360/65 |
| 4,856,078 A | * 8/1989 | Konopka | 388/831 |
| 5,013,985 A | * 5/1991 | Itoh et al. | 318/558 |
| 5,099,181 A | * 3/1992 | Canon | 318/254 |
| 5,258,696 A | * 11/1993 | Le | 318/254 |
| 5,317,244 A | * 5/1994 | Ishikura | 318/254 |
| 5,327,052 A | * 7/1994 | Sakurai et al. | 318/254 |
| 5,350,984 A | * 9/1994 | Carobolante et al. | 318/254 |
| 5,350,988 A | * 9/1994 | Le | 318/618 |
| 5,436,547 A | * 7/1995 | Nagai et al. | 318/811 |
| 5,583,404 A | * 12/1996 | Karwath et al. | 318/254 |
| 5,838,127 A | * 11/1998 | Young et al. | 318/293 |
| 5,869,946 A | * 2/1999 | Carobolante | 318/811 |
| 6,040,668 A | * 3/2000 | Huynh et al. | 318/254 |
| 6,211,635 B1 | * 4/2001 | Kambe et al. | 318/254 |
| 6,392,372 B1 | * 5/2002 | Mays, II | 318/254 |
| 6,528,968 B2 | * 3/2003 | Seima et al. | 318/811 |
| 6,611,117 B1 | * 8/2003 | Hardt | 318/254 |

* cited by examiner

*Primary Examiner*—David Martin
*Assistant Examiner*—Eduardo Colon Santana
(74) *Attorney, Agent, or Firm*—Bacon & Thomas, PLLC

(57) ABSTRACT

A speed-control drive circuit for a D.C. brushless fan motor includes a pulse width modulation input end for receiving an external pulse width modulation signal for controlling (and changing) the motor speed, and a motor winding drive circuit. The motor winding drive circuit and the pulse width modulation input end are connected to a set of motor windings. The pulse width modulation signal controls the motor winding drive circuit to cause excitation/unexcitation of the set of motor windings and to alternately changes a direction of current such that the set of motor windings adjusts a speed of the fan motor in response to excitation of the set of motor windings responsive to the pulse width modulation signal. The speed of the fan motor increases when an operational period of the pulse width modulation signal increases, and the speed of the fan motor decreases when the operational period of the pulse width modulation signal decreases.

2 Claims, 4 Drawing Sheets

SPEED-CONTROL DRIVE CIRCUIT FOR A D.C. BRUSHLESS FAN MOTOR

BACKGROUND OF THE INVENTION

1. Field of the Invention

The present invention relates to a speed-control drive circuit for a D.C. brushless fan motor. In particular, the present invention relates to a fan motor that supplies source by means using pulse width modulation to adjust the power of the fan motor, i.e., to adjust the drive circuit that controls the rotational speed of the fan motor.

2. Description of the Related Art

The heat-dissipating devices for computers, particularly portable computers (or so-called "notebooks"), are low electricity-consuming rate and low noise. In order to save electricity, the fan motor of the heat-dissipating device must change its speed in response to the change in the ambient air. In particular, the speed of the fan motor is increased when the ambient temperature rises, and the speed of the fan motor is reduced when the ambient temperature lowers. A typical method for controlling the speed of the fan motor is to directly control the voltage of the source input end. However, this causes a considerable rise in the temperature due to power consumption of the control circuit; namely, another heat source is generated. As a result, the heat source not only causes a rise in the ambient temperature but also increases the power consumption and thus fails to save electricity.

In order to improve the electricity-saving effect, current speed-control systems of fan motors for portable computers adopt pulse width modulation to supply source, thereby adjusting the power of the fan motor. A drive integrated circuit (model no. PT308F manufactured by Prolific Technology Inc.) for a D.C. brushless fan motor adopts pulse width modulation to adjust the duty ratio of the fan motor. However, the specification of PT308F drive integrated circuit could not meet that of current drive circuits for fan motors. As a result, redesigning of the drive circuit of the fan motor is required and the complexity of the fan motor increases accordingly. Further, the PT308F drive integrated circuit is expensive and thus increases the overall cost for the fan motor. Further, the volume specification of the PT308F drive integrated circuit is greater than that of ordinary drive integrated circuits such that the PT308F drive integrated circuit could not be used with small fan motors.

When a drive circuit for an ordinary fan motor uses pulse width modulation to supply source, the pulse width modulation signal of a portable computer must be connected to the drive circuit so as to control the power output of the source for the drive circuit. Thus, the drive circuit for an ordinary fan motor saves electricity and has low noise and thus can be used as a drive circuit for a low-cost small fan motor while saving the cost for redesigning for the specification. Structures, functions, and operations of typical examples of single-phase and two-phase fan motor drive circuits are explained below.

Refer to FIG. 1 that shows a drive circuit of a single-phase D.C. brushless fan motor. The drive circuit includes a motor winding CL1, a Hall element IC1, and a drive element IC2. The drive element IC2 includes a transistor for driving the motor winding CL1. The Hall element IC1 detects a change in the polarity of the permanent magnet of the rotor and generates a weak Hall voltage which is then outputted to the drive element IC2 for amplification. The amplified Hall voltage is outputted by the drive element IC2 through the output ends 01 and 02 to the motor winding CL1 to excite/unexcite the motor winding CL1 and to alternately change the direction of the current, thereby driving the rotor of the motor to turn by means of excitation. The drive element IC2 further includes a frequency generating/outputting end FG for connection with the user's end. Further, the drive element IC2 includes a control input end ST for controlling starting or stopping of the motor, wherein the motor starts to turn when the control input end ST is at a low level, and wherein the motor stops turning when the control input end ST is at a high level.

FIG. 2 illustrates a circuitry of a conventional drive circuit for a two-phase D.C. brushless fan motor. As shown FIG. 2, the drive circuit for a two-phase D.C. brushless fan motor includes a first motor winding CL1, a second motor winding CL2, a Hall element IC1, a first transistor Q1, a second transistor Q2, a first resistor R1, a second resistor R2, a third resistor R3, a first Zener diode ZD1, and a second Zener diode ZD2. The first transistor Q1, the second transistor Q2, the first resistor R1, the second resistor R2, the third resistor R3, the first Zener diode ZD1, and the second Zener diode ZD2 together form a motor winding drive circuit. The Hall element IC1 detects a change in the polarity of the permanent magnet of the rotor and generates a weak Hall voltage which is then outputted through the second resistor R2 to the first transistor Q1 and the second transistor Q2 to thereby drive the first motor winding CL1 and the second motor winding CL2 respectively connected to the collectors of the first transistor Q1 and the second transistor Q2. Thus, the motor windings CL1 and CL2 are excited/unexcited and the direction of the current is alternately changed, thereby driving the rotor of the motor to turn by means of excitation. The fan motor drive circuit further includes a frequency divider element IC3. The detected signal from the Hall element is amplified by the resistor R4 and the transistor Q3, and the amplified signal is then inputted to the input end IN of the frequency divider element IC3. Then, the amplified signal is connected through the output end A to a frequency generating/outputting end FG for connection with the user's end.

FIG. 3 illustrates a circuitry of another conventional drive circuit for a two-phase D.C. brushless fan motor. As shown FIG. 3, the drive circuit for a two-phase D.C. brushless fan motor includes a first motor winding CL1, a second motor winding CL2, a Hall element IC1, a drive element IC2, a first transistor Q1, a second transistor Q2, a first resistor R1, a second resistor R2, a third resistor R3, and a capacitor C. The first transistor Q1, the second transistor Q2, the first resistor R1, the second resistor R2, the third resistor R3, and the as capacitor C together form a motor winding drive circuit. The Hall element IC1 detects a change in the polarity of the permanent magnet of the rotor and generates a weak Hall voltage. The detected signal (i.e., the Hall voltage) is inputted to the input end IN of the drive element IC2 and then outputted through the output ends 01 and 02 to the first transistor Q1 and the second transistor Q2 for amplification to thereby drive the first motor winding CL1 and the second motor winding CL2 respectively connected to the collectors of the first transistor Q1 and the second transistor Q2. Thus, excitation/unexcitation is generated and the direction of the current is alternately changed, thereby driving the rotor of the motor to turn by means of excitation. The output end FG of the drive element IC2 is connected to the user's end.

Referring to FIGS. 1 through 3, when using conventional fan motor drive circuits adopting pulse width modulation to supply source, it is necessary to input the pulse width modulation signal into the motor winding drive circuit of the fan motor drive circuit, thereby controlling excitation/ unexcitation of the motor winding and alternately changing the direction of current.

The present invention is intended to provide a speed-control drive circuit for a D.C. brushless fan motor that eliminates the above-mentioned drawback.

SUMMARY OF THE INVENTION

An object of the present invention is to provide a D.C. brushless fan motor having a speed-control drive circuit, wherein a pulse width modulation signal is inputted to a motor winding drive circuit for a fan motor drive circuit to thereby control the motor winding drive circuit to generate the time for excitation and to thereby alternately change the direction of current. Thus, the speed of the fan motor is controlled by pulse width modulation.

Another object of the present invention is to provide D.C. brushless fan motor having a speed-control drive circuit, wherein a pulse width modulation signal is inputted to a motor winding drive circuit of an existing fan motor drive circuit. Thus, the present invention can be used with existing fan motor drive circuits.

In accordance with a first aspect of the invention, a D.C. brushless fan motor having a speed-control drive circuit is used with a single set of motor winding. The speed-control drive circuit comprises a pulse width modulation input end for receiving a pulse width modulation signal and a motor winding drive circuit. The motor winding drive circuit and the pulse width modulation input end are connected to a set of motor winding. The pulse width modulation signal controls the motor winding drive circuit to cause excitation/ unexcitation of the set of motor winding and to alternately change a direction of current such that the set of motor winding adjusts a speed of the fan motor in response to excitation of the set of motor winding responsive to the pulse width modulation signal. The speed of said fan motor increases when an operational period of the pulse width modulation signal increases, and the speed of the fan motor decreases when the operational period of the pulse width modulation signal decreases.

In accordance with a second aspect of the invention, a D.C. brushless fan motor having a speed-control drive circuit is used with two sets of motor windings. The speed-control drive circuit comprises a pulse width modulation input end for receiving a pulse width modulation signal and a motor winding drive circuit. The motor winding drive circuit and the pulse width modulation input end are connected to two sets of motor windings. The pulse width modulation signal controls the motor winding drive circuit to cause excitation/unexcitation of the two sets of motor windings and to alternately change a direction of current such that the two sets of motor windings adjust a speed of the fan motor in response to excitation of the two sets of motor windings responsive to the pulse width modulation signal. The speed of the fan motor increases when an operational period of the pulse width modulation signal increases, and the speed of the fan motor decreases when the operational period of the pulse width modulation signal decreases.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
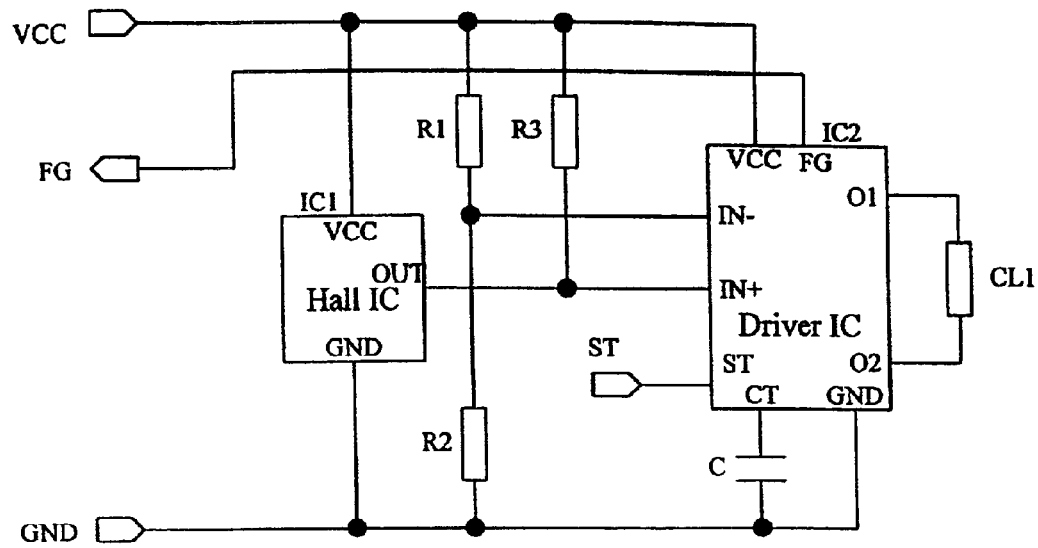
FIG. 1 is a circuitry of a conventional drive circuit for a single-phase D.C. brushless fan motor.
Figure 4:
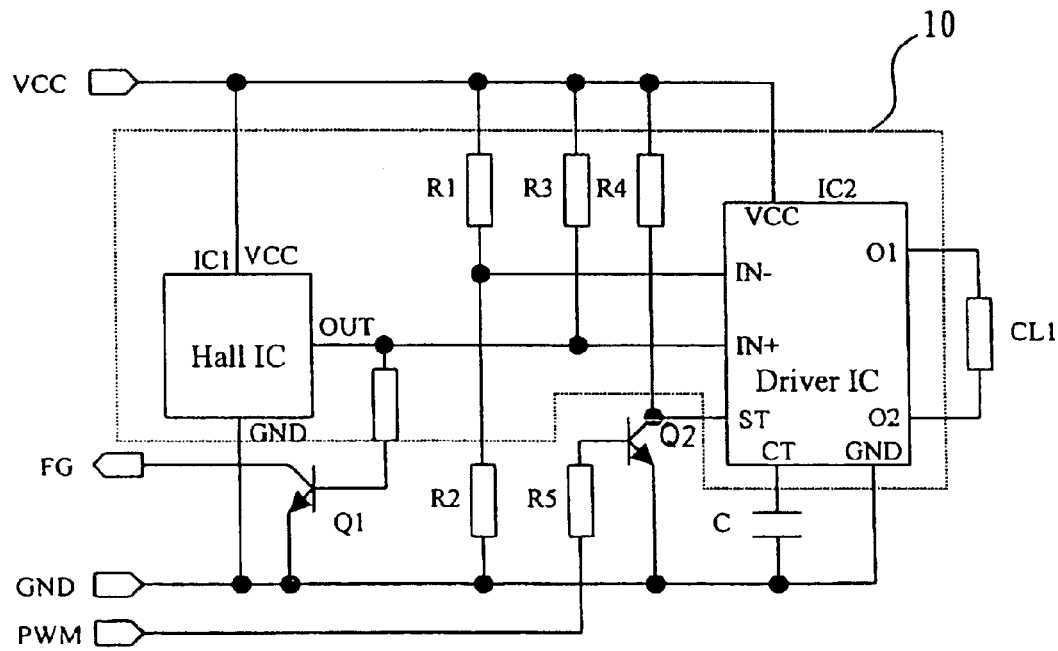
FIG. 4 is a circuitry of a speed-control drive circuit for a single-phase brushless fan motor in accordance with a first embodiment of the invention.
Figure 5:
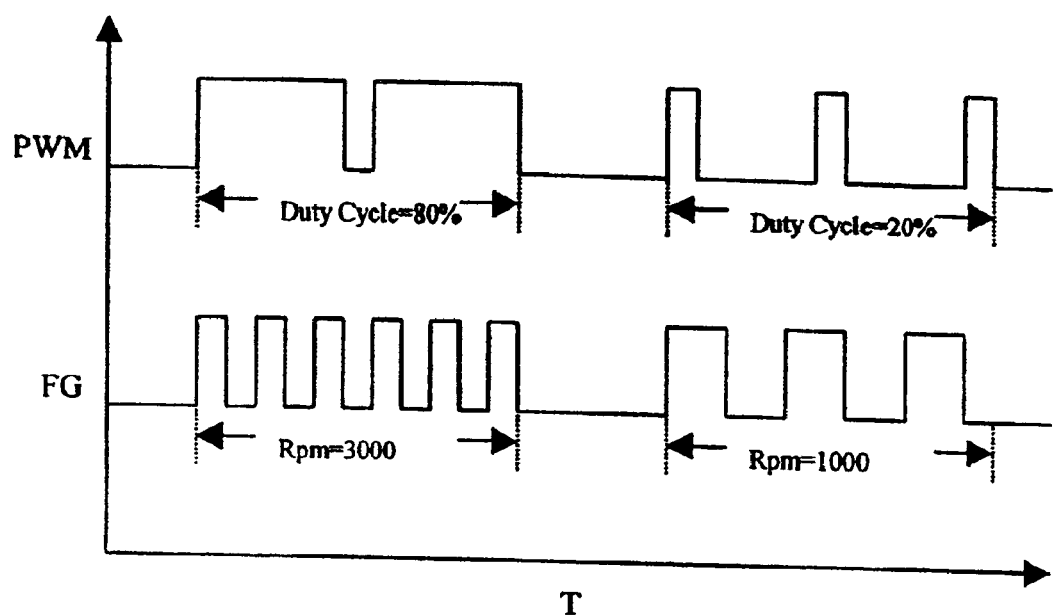
FIG. 5 is a diagram illustrating the relative time sequence between the signal period of pulse width modulation and the rotational speed of the fan motor.

FIG. 4 is a circuitry of a speed-control drive circuit for a single-phase brushless fan motor in accordance with a first embodiment of the invention. FIG. 5 is a diagram illustrating the relative time sequence between the signal period of pulse width modulation and the rotational speed of the fan motor. The numerals in FIG. 4 identical to those in FIG. 1 denote identical elements in FIG. 1, and detailed description of these elements is not given to avoid redundancy. Only the difference between FIG. 4 and FIG. 1 is described in the following paragraphs.

As illustrated in FIG. 4, a drive element IC2 of the speed-control drive circuit for a single-phase brushless fan motor includes a control input end ST that is used to control starting of the motor or to stop the motor. The first embodiment of the speed-control drive circuit in accordance with the present invention comprises a pulse width modulation input end PWM for receiving an external pulse width modulation signal for controlling (and changing) a motor speed, as described in detail below, and a motor winding drive circuit 10. The pulse width modulation input end PWM is connected through a transistor Q2 and a resistor R5 to the control input end ST of the drive element IC2 of the motor winding drive circuit 10. By means of altering the period of the external pulse width modulation signal, the duty cycle of the pulse width modulation signal is changed to thereby control the motor winding drive circuit to generate the time for exciting/unexciting the motor winding CL1. Output ends 01 and 02 of the motor winding drive circuit 10 are connected to a set of motor windings CL1. Thus, the pulse width modulation signal controls the power of the motor winding CL!, thereby changeably controlling the speed of the fan motor.

As can be seen in FIG. 5 that shows relative time sequence between the pulse width modulation input end PWM and the output end FG of the motor winding drive circuit 10, the operating period of the pulse width modulation signal PWM corresponds to the speed of the detected signal. In time sequence T. e.g., when the operating period of the pulse width modulation signal PWM is increased to 80%, the detected signal speed of the motor fan operated through the motor winding drive circuit 10 is increased to 3000 RPM. On the other hand, when the operating period of the pulse width modulation signal PWM is decreased to 20%, the detected signal speed of the motor fan is decreased to 1000 RPM. Similarly, when the operating period of the pulse width modulation signal PWM is decreased to 0%, the voltage of the control input end ST of the drive element IC2 is kept to be equal to GND to thereby completely stop the fan motor.

Figure 2:
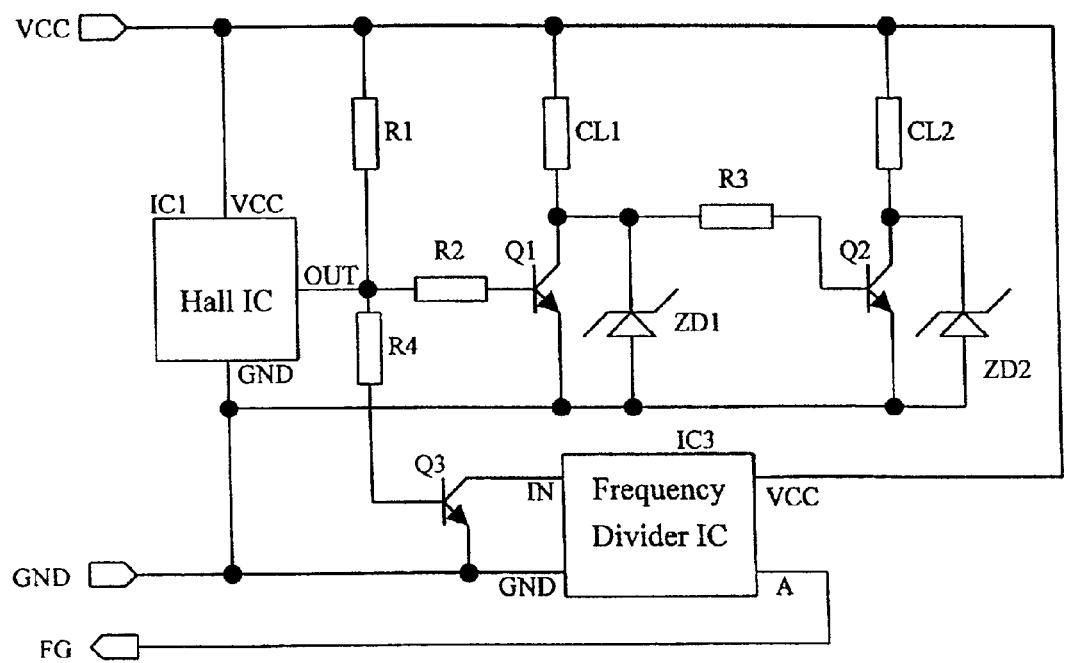
FIG. 2 is a circuitry of a conventional drive circuit for a two-phase D.C. brushless fan motor.
Figure 6:
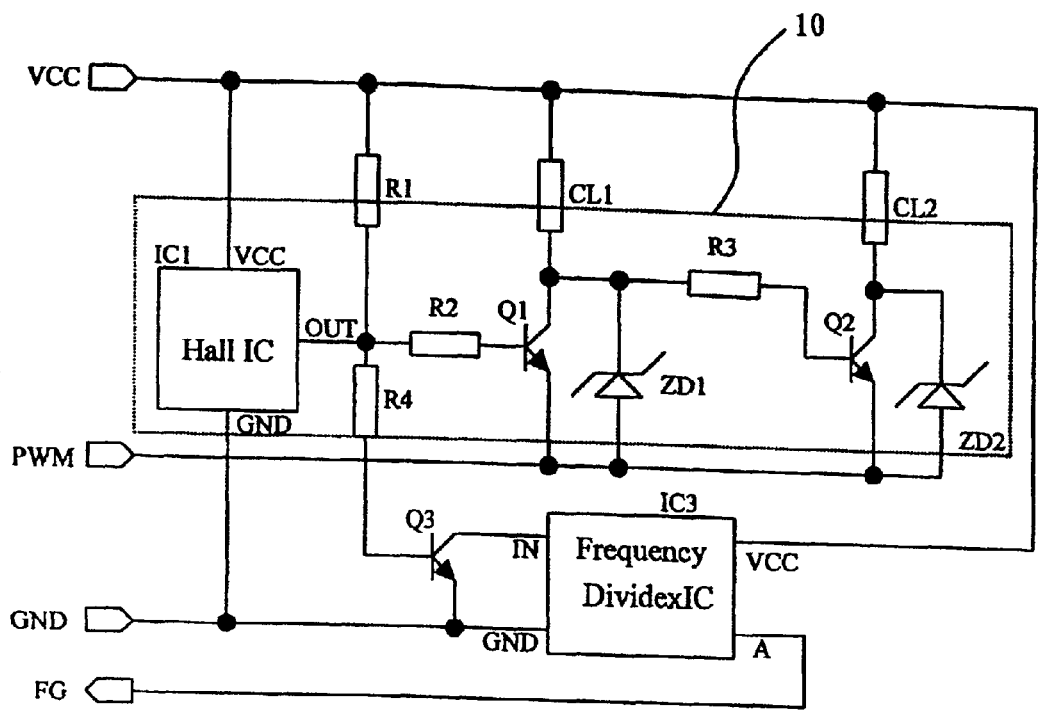
FIG. 6 is a circuitry of a speed-control drive circuit for a two-phase brushless fan motor in accordance with a second embodiment of the invention.

FIG. 6 is a circuitry of a speed-control drive circuit for a two-phase brushless fan motor in accordance with a second embodiment of the invention. The numerals in FIG. 6 identical to those in FIG. 2 denote identical elements in FIG. 2, and detailed description of these elements is not given to avoid redundancy. Only the difference between FIG. 6 and FIG. 2 is described in the following paragraphs.

Referring to FIG. 6, the speed-control drive circuit in accordance with the second embodiment of the invention comprises a pulse width modulation input end PWM and a motor winding drive circuit 10. The pulse width modulation input end PWM is directly connected to the emitter of the first transistor Q1 and the second transistor Q2 of the motor winding drive circuit 10. By means of periodical change in the high and low levels of the pulse width modulation signal, the emitters of the transistor Q1 and Q2 generate periodical change in the high and low levels to thereby control the motor winding drive circuit 10 to generate the time for exciting/unexciting the first and second motor windings CL1 and CL2. The transistor Q1 and the transistor Q2 of the motor winding drive circuit 10 are respectively connected to the first motor winding CL1 and the second motor winding CL2. Thus, the pulse width modulation signal controls the power of the source of the motor windings CL1 and CL2, thereby controlling the speed of the fan motor. Meanwhile, the emitters of the a transistor Q1 and the transistor Q2 are connected to an outside of the motor winding drive circuit 10 and thus acts as a fourth conducting wire for proceeding with PWM speed control.

Figure 3:
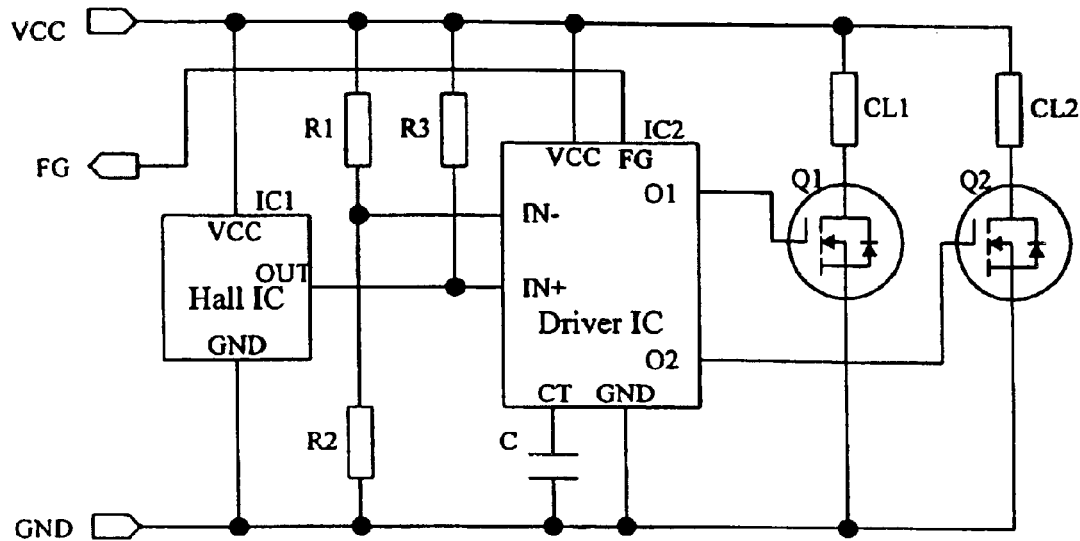
FIG. 3 is a circuitry of another conventional drive circuit for a two-phase D.C. brushless fan motor.
Figure 7:
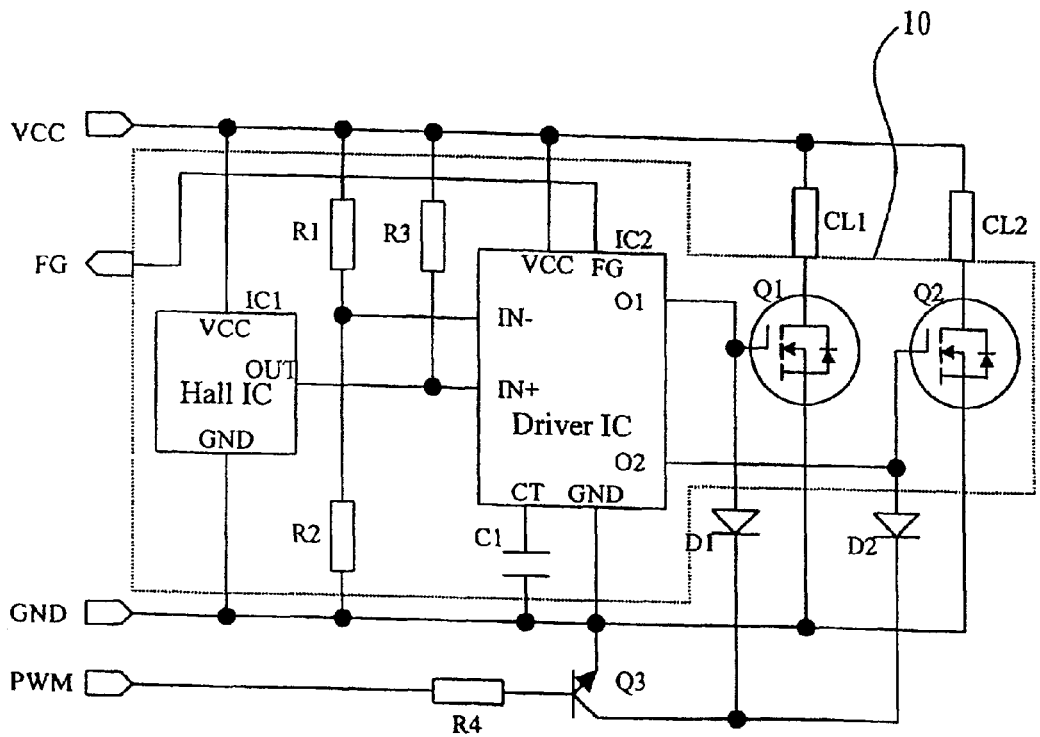
FIG. 7 is a circuitry of a speed-control drive circuit for a two-phase brushless fan motor in accordance with a third embodiment of the invention.

FIG. 7 is a circuitry of a speed-control drive circuit for a two-phase brushless fan motor in accordance with a third embodiment of the invention. The numerals in FIG. 7 identical to those in FIG. 3 denote identical elements in FIG. 3, and detailed description of these elements is not given to avoid redundancy. Only the difference between FIG. 7 and FIG. 3 is described in the following paragraphs.

Referring to FIG. 7, the speed-control drive circuit in accordance with the third embodiment of the invention comprises a pulse width modulation input end PWM and a motor winding drive circuit 10. The pulse width modulation input end PWM is directly connected to a transistor Q3 and a resistor R4 and then respectively connected through a first diode D1 and a second diode D2 to the gates of the transistor Q1 and the transistor Q2 of the motor winding drive circuit 10. By means of periodical change in the high and low levels of the pulse width modulation signal, the gates of the transistor Q1 and Q2 generate periodical change in the high and low levels to thereby control the gates of the transistor Q1 and Q2 of the motor winding drive circuit 10 to generate the time for exciting/unexciting the motor windings CL1 and CL2. The transistor Q1 and the transistor Q2 of the motor winding drive circuit 10 are respectively connected to the first motor winding CL1 And the second motor winding CL2. Thus, the pulse width modulation signal controls the power of the source of the motor windings CL1 and CL2, thereby controlling the speed of the fan motor. Meanwhile, the emitters of the transistor Q1 and the transistor Q2 are connected to an outside of the motor winding drive circuit 10 and thus act as a fourth conducting wire for proceeding with PWM speed control.

Although the invention has been explained in relation to its preferred embodiment, it is to be understood that many other possible modifications and variations can be made without departing from the scope of the invention as hereinafter claimed.

What is claimed is:

1. A D.C. brushless fan motor having a speed-control drive circuit for two sets of motor windings, said speed-control drive circuit comprising:

a pulse width modulation input end included in said motor and arranged to be connected to a pulse width modulation system external to said fan motor for receiving an external pulse width modulation signal for controlling and changing a speed of said motor; and a motor winding drive circuit, said motor winding drive circuit comprising a first transistor, a second transistor, a first resistor, a second resistor, a third resistor, a first Zener Diode, and a second Zener diode, said motor winding drive circuit and said pulse width modulation input end being connected to said two sets of motor windings, and said pulse width modulation input end being directly connected to an emitter of said first transistor and an emitter of said second transistor of said motor winding drive circuit such that said emitters of said first transistor and said second transistor generate periodical change in high and low levels in response to periodical change in high and low levels of the pulse width modulation signal, thereby controlling said motor winding drive circuit to generate the time for exciting/unexciting of said two sets of motor windings;

said pulse width modulation signal controlling said motor winding drive circuit to cause excitation/unexcitation of said two sets of motor windings and to alternately change a direction of current such that said two sets of motor windings adjusts a speed of the fan motor in response to excitation of said two sets of motor windings responsive to said pulse width modulation signal;

wherein the speed of said fan motor increases when an operational period of said pulse width modulation signal increases, and wherein the speed of said fan motor decreases when the operational period of said pulse width modulation signal decreases to thereby change the speed of said motor.

2. A D.C. brushless fan motor having a speed-control drive circuit for two sets of motor windings, said speed-control drive circuit comprising:

a pulse width modulation input end included in said motor and arranged to be connected to a pulse width modulation system external to said fan motor for receiving an external pulse width modulation signal for controlling and changing a speed of said motor; and a motor winding drive circuit including a first transistor, a second transistor, a first resistor, a second resistor, a third resistor, and a capacitor, said motor winding drive circuit and said pulse width modulation input end being connected to said two sets of motor windings, and said pulse width modulation input end being connected to a third transistor and a fourth resistor and then respectively connected through a first diode and a second diode to a gate of said first transistor and a gate of said second transistor of said motor winding drive circuit such that said gates of said first transistor and said second transistor generate periodical change in high and low levels in response to periodical change in high and low levels of the pulse width modulation signal, thereby controlling said gates of said first transistor and said second transistor to generate the time for exciting/unexciting said two sets of motor windings;

said pulse width modulation signal controlling said motor winding drive circuit to cause excitation/unexcitation of said two sets of motor windings and to alternately change a direction of current such that said two sets of motor windings adjusts a speed of the fan motor in response to excitation of said two sets of motor windings responsive to said pulse width modulation signal;

wherein the speed of said fan motor increases when an operational period of said pulse width modulation signal increases, and wherein the speed of said fan motor decreases when the operational period of said pulse width modulation signal decreases to thereby change the speed of said motor.

* * * * *